United States Patent [19]
Beasley et al.

[11] 3,921,311
[45] Nov. 25, 1975

[54] CLINICAL DEMONSTRATION MODEL

[75] Inventors: W. B. Rogers Beasley, Brooklyn, N.Y.; Jean Morehead, Needham Heights, Mass.; Elaine Pendleton, Brooklyn; George Schmidt, Douglaston, both of N.Y.

[73] Assignee: The Pathfinder Fund, Boston, Mass.

[22] Filed: Jan. 6, 1975

[21] Appl. No.: 538,766

[52] U.S. Cl. .................................................. 35/17
[51] Int. Cl.² ........................................ G09B 23/30
[58] Field of Search ........................................ 35/17

[56] References Cited
UNITED STATES PATENTS

| | | | |
|---|---|---|---|
| 2,132,226 | 10/1938 | Wahlberg | 35/17 |
| 2,495,568 | 1/1950 | Coel | 35/17 |
| 2,551,560 | 5/1951 | Graves | 35/17 |
| 3,273,261 | 9/1966 | Lovercheck | 35/17 |
| 3,766,666 | 10/1973 | Stroop | 35/17 |

*Primary Examiner*—Harland S. Skogquist
*Attorney, Agent, or Firm*—Leonard H. King

[57] ABSTRACT

A clinical, demonstration model of the human female pelvic region is provided and may include a housing having storage space for inter-uterine contraceptive devices (I.U.D.) and diaphragms or the like. The model is small but has realistic measurements and is physiologically valid. The housing may also include a removable cover that simulates the abdominal wall so that when the cover is removed, the internal organs such as replicas of a pelvis, a vagina, a uterus, a cervix etc. are readily visible. A variety of different plastics are used to provide functional and tactile characteristics of the uterus, the cervix and the vagina. Both the vagina and the cervix are readily replaceable and the uterus is supported so that it can be rotated about a first, transverse axis into an anterior, a mid or a posterior position as desired. Means to lock the uterus in the desired position may also be included. Means are further provided for preventing rotation of the uterus about a second axis that is parallel to the longitudinal axis thereof and perpendicular to the first axis.

15 Claims, 5 Drawing Figures

3,921,311

CLINICAL DEMONSTRATION MODEL

BACKGROUND OF THE INVENTION

1. Field of the Invention

This invention relates generally to clinical demonstration models and more particularly to a functionally realistic model of the human female pelvic region.

2. Description of the Prior Art

In the training of medical and paramedical personnel, it is necessary for the students to observe the human body portions being studied an to manipulate those portions in the same manner as would be required in actual practice. However, there is an obvious lack of patient availability for human pelvic region observation and manipulation by students.

It is therefore evident that there is a substantial need for a physiologically accurate demonstration model containing selected portions of the human anatomy. The patent literature provides numerous examples of prior art attempts at achieving satisfactory clinical models. However, in an effort to provide a realistic simulation of the human female pelvic region for example, the prior art models failed to permit manual manipulation by the students as well as visual observation by the students as the result of their manipulation. That is, material representing surrounding tissues interfered with the manipulation of the various organs as well as with the visual observations thereof.

One example of the prior art is disclosed in U.S. Pat. No. 2,495,568 granted on Jan. 24, 1950 to Leo Coel. In this patent a fairly accurate reproduction of the human female pelvic region is provided. However, in the fully assembled or closed condition of the device, it is impossible to visually observe the manipulations that are being made. Thus, this prior art device does not facilitate the learning process as well as it should even though it does represent a faithful reproduction of the human female pelvic region. U.S. Pat. No. 2,132,225 granted on Oct. 4, 1938 to Frank Wahlberg is similar to the first mentioned prior art patent in that a two-part demonstration model is provided. However, the same deficiencies are also present.

U.S. Pat. Nos. 2,284,888 and 3,766,666 are further examples of the prior art in this field. U.S. Pat. No. 2,284,888, which was granted on June 2, 1942 to James R. Arneill, Jr., relates to a demonstration device for vaginal diaphragms. The deficiency of this structure is evident in that it relates to only a single, isolated organ. U.S. Pat. No. 3,766,666 granted on Oct. 23, 1973 to John Stroop is another form of uterine simulator trainer that is intended to instruct medical personnel on the insertion of an I.U.D. Like the Arneill, Jr. patent, the Stroop disclosure relates only to a single, internal organ.

SUMMARY OF THE INVENTION

The present invention provides a clinical demonstration model of a human female pelvic region and is useful, for example, for the teaching of the insertion and removal of an I.U.D. and of a vaginal diaphragm. While the model comprising this invention is small in overall size, its measurements are physiologically valid. The model may include a housing having storage space for the I.U.Ds. and diaphragms as well as a removable cover that simulates the abdominal wall. A variety of plastics are used in the present invention to provide functional and tactile characteristics of the various internal organs associated with the human female pelvic region.

The present invention further comprises a vulva replica including labia that is styled to provide a realistic sense of resistance to the insertion of a speculum and to admit naturally the examining fingers. The replica of the vaginal canal is in the form of removable, transparent elastomeric tube that is readily distensible by the insertion of the diaphragm. The tube is mounted on the interior aspect of the vulva and pelvic rim, and runs to the cervix. The replica of the vagina canal is readily replaceable. The cervix replica, according to the present invention, is also readily replaceable, should it become damaged by repeated applications of a tenaculum. The body of the uterus replica is transparent so that the unfolding of the I.U.D. after the insertion thereof against the fundus is readily visible. In the present invention the replica of the uterus is suspended on simulated cardinal ligaments which can be selectively rotated about a first, transverse axis so as to place the uterus replica in an anterior, a mid or a posterior position as desired. The uterus may also be locked in the desired position. In the present invention a portion of the uterus replica cooperates with the simulated cardinal ligaments for preventing rotation of the uterus replica about a second axis that is parallel to the longitudinal axis thereof and which is perpendicular to the first axis. Replicas of the oviducts or fallopian tubes are suitably anchored in the housing, further preventing rotation.

Accordingly, it is an object of the present invention to provide an improved clinical model of a human female pelvic region that permits the practice of the insertion and removal of the I.U.Ds. and vaginal diaphragms or the like.

Another object of the present invention is to provide an improved clinical model, as described above, that is low in cost, that is easily transportable and whose measurements are accurate and physiologically valid.

A further object of the present invention is to provide an improved clinical model, as described above, having a housing that has means permitting storage of the I.U.Ds. and diaphragms and which also includes a removable cover so that visual observation of the insertion and removal of the I.U.Ds. and vaginal diaphragms may be made.

A particular object of the present invention is to provide an improved clinical model, as described above, wherein the replica of the vagina is made of a readily distensible, elastomeric material that is translucent and which is readily replaceable.

A further object of the present invention is to provide an improved clinical model, as described above, wherein the replica of the uterus is rotatable about a first axis to permit the selected positioning thereof and wherein means may be provided for locking as well as for preventing rotation of the uterus replica about an axis perpendicular to the first axis.

These and other objects, features and advantages of the invention will, in part, be pointed out with particularity and will, in part, become obvious from the following more detailed description of the invention, taken in conjunction with the accompanying drawing which forms an integral part thereof.

BRIEF DESCRIPTION OF THE DRAWING

In the various figures of the drawing like reference characters designate like parts. In the drawing.

DESCRIPTION OF THE PREFERRED EMBODIMENT

Figure 1:
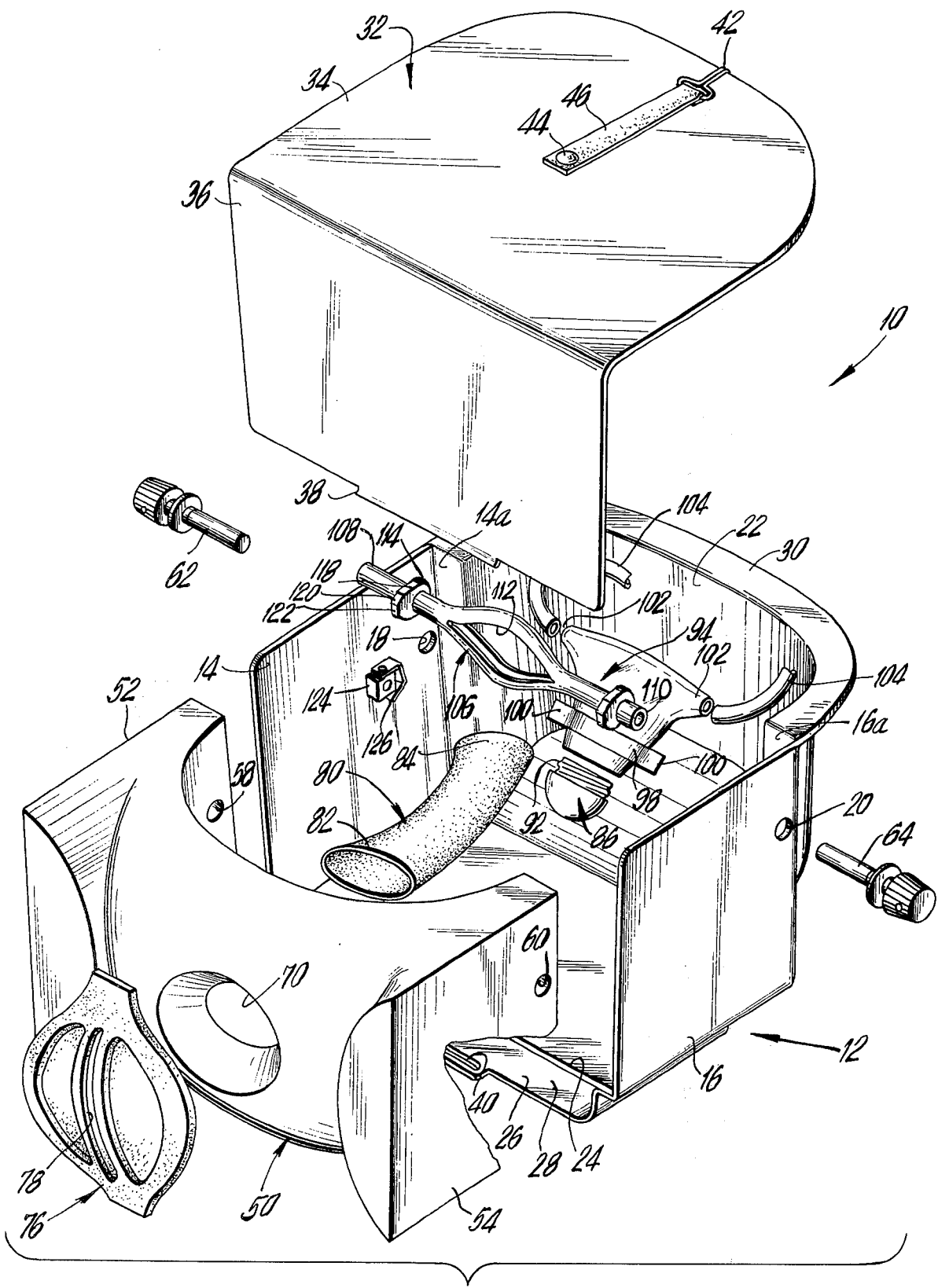
FIG. 1 is an exploded, perspective view of the clinical demonstration model comprising the present invention.
Figures 2, 3:
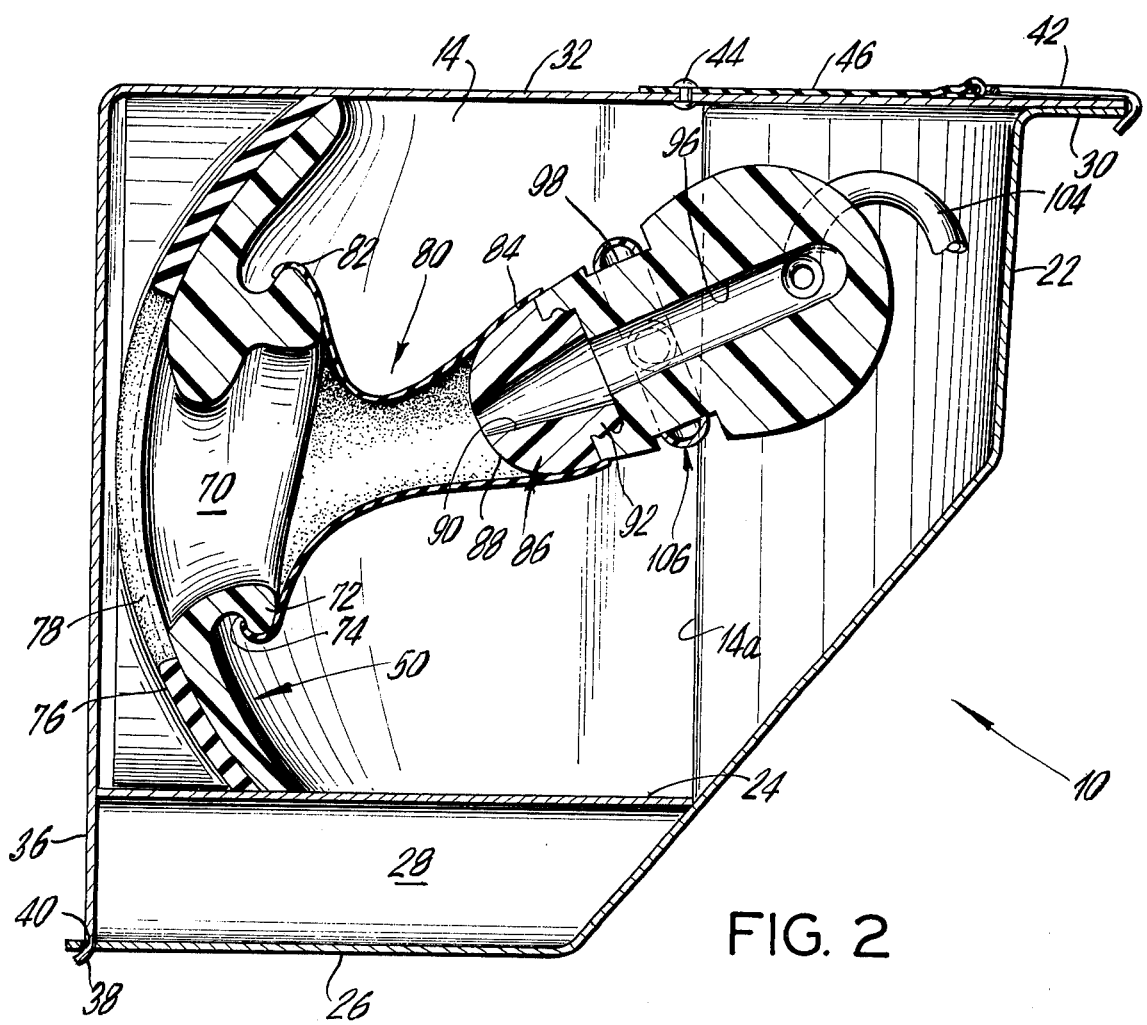
FIG. 2 is a longitudinal, sectional view in elevation illustrating the same components as shown in FIG. 1.
FIG. 3 is an exploded view of an alternative form of two of the members shown in the embodiment of FIG. 1.

Referring now to FIGS. 1 and 2 in particular there is shown one embodiment of the present invention comprising a clinical model 10 of the human female pelvic region. The model 10 includes a housing which may be made of metal, plastic or the like and which is generally designated by reference character 12. The housing 12, in the embodiment which is illustrated by way of example is comprised of a pair of laterally opposed side walls 14 and 16 each having aligned holes 18 and 20, respectively, therein. The housing 12 further includes a rear wall 22 and a pair of upper and lower, spaced-apart base walls 24 and 26, respectively, which define therebetween a storage space 28 for the demonstration I.U.Ds. and vaginal diaphragm. The side walls 14 and 16 as well as the rear wall 22 are provided with a flange-like extension 30 at the upper end thereof.

A removable cover, generally designated by the reference character 32, is also provided. The cover 32, which may also be made of metal, plastic or the like, includes a first leg 34 that is adapted to rest on the upper edge of the side walls 14 and 16 as well as on the flange 30. A second leg 36 is also provided and includes a tongue 38 at the lower end thereof. As shown best in FIG. 2, the tongue 38 is adapted to mate with a groove 40 formed in the lower base wall 26. A clip 42 that is adapted to releasably engage the flange 30 is mounted on the leg 34 of the cover 32 by means of a rivet 44 and an elongated, elastic member 46. When the cover 32 is in position, the tongue 38 will engage the groove 40 and the clip 42 will engage the flange 30. The cover 32 is intended to simulate the abdominal wall so that upon removal thereof the internal organs which will be described subsequently will be readily visible.

In the embodiment illustrated in FIGS. 1 and 2, a replica of a pelvis, which is generally designated by the reference character 50 is mounted within the housing 12. The pelvis replica 50, which may be made of a suitable, rigid plastic material such as polystyrene or polypropylene includes a pair of laterally spaced apart side walls 52 and 54 and a rearward, generally concave surface 56. Openings 58 and 60 are formed in the side walls 52 and 54, respectively, and, in the assembled condition, are aligned with the openings 18 and 20, respectively, in the side walls 14 and 16, respectively, of the housing 12. A pair of pivot pins 62 and 64 are loosely received in the aligned openings 18, 58 and 20, 60, respectively, for the purpose of retaining the pelvis replica 50 within the housing 12. In the assembled condition, such as shown in FIG. 2, the base of the pelvis replica 50 rests on the upper base wall 24 of the housing 12 while the rearward surfaces of the side walls 52 and 54 of the pelvis replica 50 abut a pair of laterally oriented, inwardly directed vertical extensions 14a and 16a of the side walls 14 and 16, respectively.

The pelvis replica 50 is further provided, on the concavely curved front wall thereof, with a central longitudinally extending inwardly converging conical opening 70 that represents the vulva. As shown best in FIG. 2 the inside surface of the front wall of the pelvis replica 50 is also formed with an integral annular lip or rim 72 that is defined by a groove 74 which circumscribes the opening 70. A labia replica, generally designated by the reference character 76, is positioned on the front surface of the pelvis replica 50. The labia replica 76, which may be made of any suitable plastic material such as silicone rubber, polyethylene or polypropylene is relatively thin and flexible and is provided with an elongated narrow opening 78 that is in communication with the opening 70 formed in the front wall of the pelvis replica 50.

A replica 80 of the vagina is made of an elongated, elastomeric material such as rubber which is preferably transparent so as to make the positioning of the diaphragm or I.U.D. readily visible. A condom with the tip removed is a suitable material. The vagina replica 80 has a first end 82 which can be fitted over the rim 72 and which can be removably secured in the annular groove 74.

The other end 84 of the vagina replica 80 is removably mounted on a replica of the cervix, which is generally designated by the reference character 86. As will be seen best in FIG. 2, for example, the cervix replica 86 is provided with a hemispherical forward end 88 and a conical bore 90 that diverges therethrough from front to back. The cervix replica 86 may be made from any suitable plastic material such as polystyrene, polypropylene or polyethylene and, on the rearward surface thereof, such as shown in FIG. 2 for example, is formed with screw threads 92 which are adapted to mate with threads formed on the forward end of a uterus replica, generally designated by the reference character 94.

The uterus replica 94, which may be made of a transparent plastic material such as polystyrene, polycarbonate or polyethylene, is provided with a central bore 96 that is in communication with the bore 90 formed in the cervix replica 86. The uterus replica 94 is further provided with an annular external groove 98 having a pair of laterally extending bosses 100, the purpose of which will be described subsequently. A pair of lateral extensions 102 are formed integrally with the uterus replica 94 at the rearward end thereof so that the uterus replica 94 may be coupled to replicas 104 of the oviducts or fallopian tubes. Any suitable means may be used for anchoring the remote ends of the fallopian tube replicas 104 to the housing 12 at any convenient location.

A transversely extending tube 106 that represents the cardinal ligaments is provided with laterally spaced apart end portions 108 and 110 that are adapted to be rigidly secured to the pivot pins 62 and 64 respectively. The central portion 112 of the tube 106 is split and is arranged to be positioned in and at least partially about the annular groove 98 of the uterus replica 94. In the assembled condition the laterally extending bosses 100 are engaged in the opposed ends of the split section 112 so as to prevent rotation of the uterus replica 94 about the axis of the bore 96 which is perpendicular to the axis defined by the laterally extending bosses 100.

The uterus replica 94 is permitted to selectively rotate about the axis of the tube 106 by means of the cooperation of the bosses 100, the split central section 112 of the tube 106, the tube ends 108 and 110, and the pivot pins 62 and 64 which are rigidly coupled to the tube end 108 and 110. This rotation procedure permits selective displacement of the uterus replica 94 to an anterior, a mid or a posterior position, as desired. In order to lock the uterus replica 94 in the desired position, collars 114 and 116 are mounted on the tube ends 108 and 110, respectively.

The collars 114 and 116 are each provided with flat surfaces 118, 120 and 122 which correspond, respectively, to the anterior, the mid and the posterior positions of the uterus replica 94. The collars 114 and 116 are positioned in spaced, mating opposition to a pair of leaf springs 124 which are mounted on blocks 126 that are suitably secured to the side walls 14 and 16 on the inside surfaces thereof. It will be appreciated that as the pivot pins 62 and 64 are rotated, the elongated, transversely oriented tube 106 which is rigidly coupled thereto will pivot the uterus replica 94 about an axis that is coincidental with the laterally extending bosses 100. The cooperation between the collars 114 and 116 and the leaf springs 124 associated therewith will assure that the uterus replica 94 will be releasably held in any of the three desired positions. Both the anti-rotation means and the locking means for the uterus replica are shown by way of example only and are not intended to be limiting as to the scope of this invention.

Turning now to FIG. 3 there is shown an alternative embodiment of the mating arrangement between the cervix 86 and the uterus 94. Instead of utilizing screw threads as in the previous embodiment, the uterus 94' of the FIG. 3 embodiment is provided with a keyhold type slot 128 that mates with a pair of radially directed tabs 130 formed on the rearward surface of the cervix replica 86'. Thus with the embodiment illustrated in FIG. 3 only a quarter turn is needed to assemble and disassemble the cervix replica 96' with respect to the uterus replica 94'.

Figure 4:
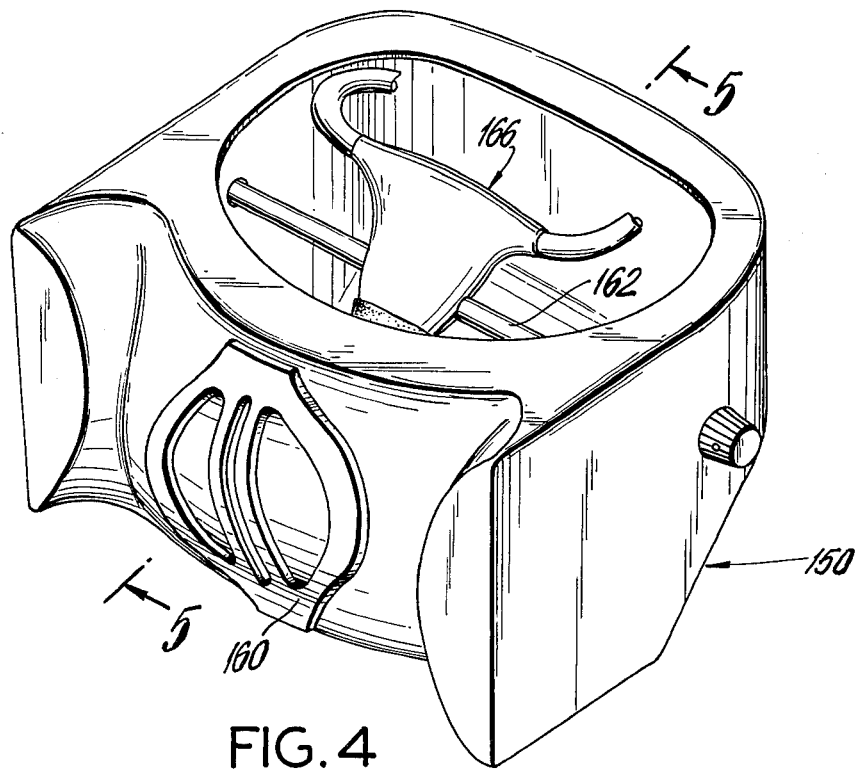
FIG. 4 is a perspective view of an alternative construction of the clinical demonstration model comprising this invention.
Figure 5:
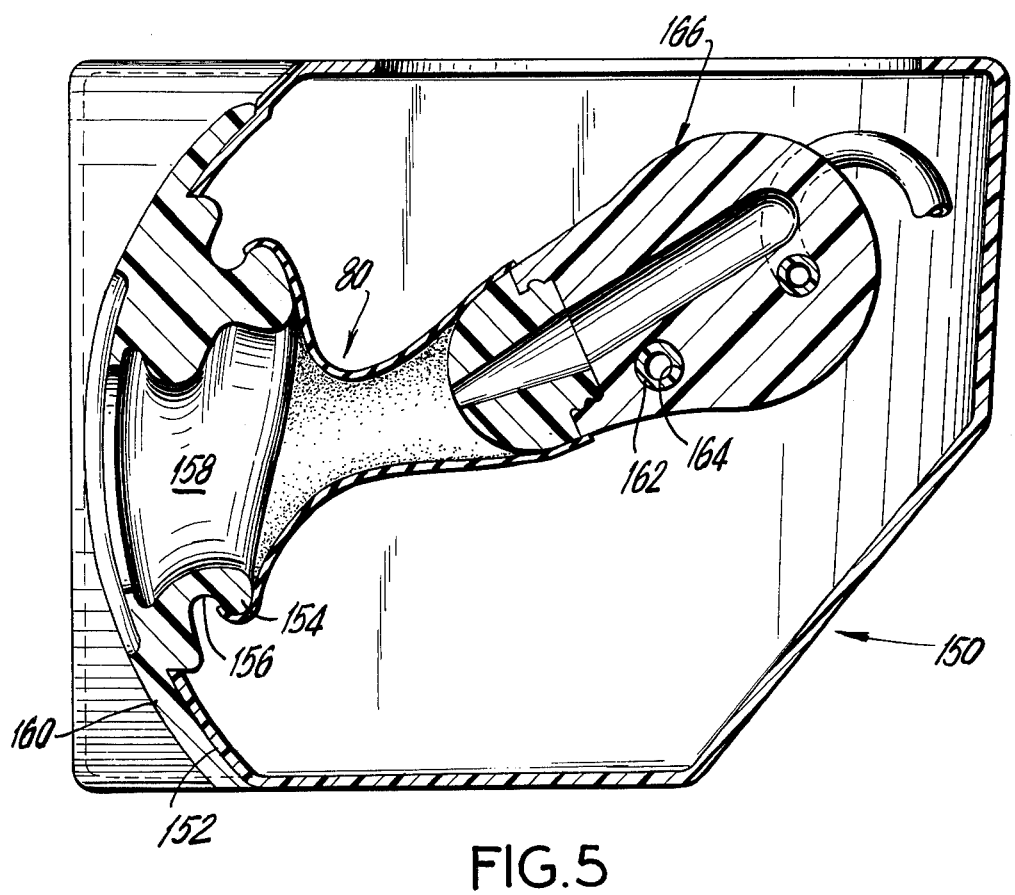
FIG. 5 is a transverse, sectional view taken along line 5—5 of FIG. 4.

As shown in FIGS. 4 and 5 the case 150 may be fabricated, such as by rotational molding, as a one piece unit having a flange 152 blended inwardly into the outer contour thereof. The case may be made of vinyl or polyethylene. In this embodiment the rim 154, the groove 156, the vulva replica 158 and the labia replica 160 may all be fabricated as an integral unit.

In this second embodiment, a transversely extending tube 162 that represents the cardinal ligaments passes through a hole 164 molded in the uterus replica 166 and is cemented in place. Selective rotation of the uterus replica 166 about the axis of the tube 162 is permitted as described hereinbefore in connection with the previous embodiment. Frictional engagement may be employed in the second embodiment to retain the uterus replica 166 in its desired angular position.

It will be appreciated from the foregoing that an improved, clinical model of a human female pelvic region is provided. By virtue of the present invention, medical and paramedical personnel may practice the insertion and removal of I.U.Ds. and vaginal diaphragms. The model is small but is realistic and physiologically accurate. Storage means are provided within the housing for I.U.Ds. and diaphragms. The removable cover of the present invention simulates the abdominal wall so that when the cover is removed the internal organs are readily visible. The pelvis replica is made from a suitable plastic that provides a simulated vulva having a realistic sense of resistance to the insertion of the speculum. The vaginal canal is both readily removable and replaceable as well as transparent. Two embodiments of a removable cervix replica are provided, either of which is easily replaceable should it become damaged. By making the body of the uterus replica transparent the unfolding of an I.U.D. is readily visible. As noted hereinabove, the uterus is suspended so as to permit displacement to any one of three desired positions and is lockable at the selected position. However, the uterus is prevented from rotation about its own longitudinal axis.

There has been disclosed heretofore the best embodiment of the invention presently contemplated. However, it is to be understood that various changes and modifications may be made thereto without departing from the spirit of the invention.

What we claim as new and desire to secure by Letters Patent are:

1. A clinical demonstration model of the human female pelvic region, said model comprising:
   a. a housing;
   b. a replica of a pelvis mounted in said housing;
   c. a transparent replica of a uterus mounted in said housing in opposition to said pelvis replica;
   d. a replaceable replica of a cervix mounted on said uterus replica;
   e. a resilient, transparent replica of a vagina replaceably positioned between and coupling said cervix to said pelvis replica; and
   f. means for adjustably mounting said uterus replica within said housing and for selectively rotating said uterus replica about a transverse first axis to an anterior, a mid, or a posterior position.

2. The model according to claim 1 wherein there is further provided means for locking said uterus replica in said selected position.

3. The model according to claim 2 wherein said locking means is integral with said mounting means of said uterus replica and wherein said housing includes means cooperating therewith whereby any one of said positions may be selected and retained.

4. The model according to claim 1 wherein said housing includes a storage area of I.U.Ds., diaphragms or the like.

5. The model according to claim 1 wherein said housing includes a removable cover that simulates the abdominal wall.

6. The model according to claim 1 wherein there are further included simulated fallopian tubes and wherein the juncture of one end of each said simulated fallopian tube and said uterus replica lies parallel to said first axis.

7. The model according to claim 1 wherein there is further included mating thread means for coupling said cervix replica to said uterus replica.

8. The model according to claim 1 wherein there is further included quarter turn fastening means for coupling said cervix replica to said uterus replica.

9. The model according to claim 1 wherein said pelvis replica is comprised of integrally formed labia and further including an integral rim for receiving said vagina replica.

10. The model according to claim 1 wherein said adjustable mounting means for said uterus replica comprises tube means extending transversely with respect thereto and rigidly secured to said uterus replica.

11. The model according to claim 1 wherein said pelvis replica includes simulated labia.

12. The model according to claim 11 wherein said simulated labia are flexible.

13. The model according to claim 1 wherein said mounting means for said uterus replica includes a pair of laterally spaced apart, rotatable pivot pins mounted in said housing and a replica of cardinal ligaments secured to the inner ends of said pivot pins, the opposed ends of said ligaments replica being coupled to said uterus replica.

14. The model according to claim 13 wherein the central portion of said ligament replica is split longitudinally and wherein said uterus replica includes an annular groove for receiving said split central portion of said ligament replica.

15. The model according to claim 14 further including means for preventing rotation of said uterus replica comprising means extending radially from said annular groove and into engagement with said split central portion of said ligament replica.

* * * * *